D. S. HOLT.
WEIGHING APPARATUS.
APPLICATION FILED FEB. 5, 1919.
1,317,135.  Patented Sept. 23, 1919.
2 SHEETS—SHEET 1.
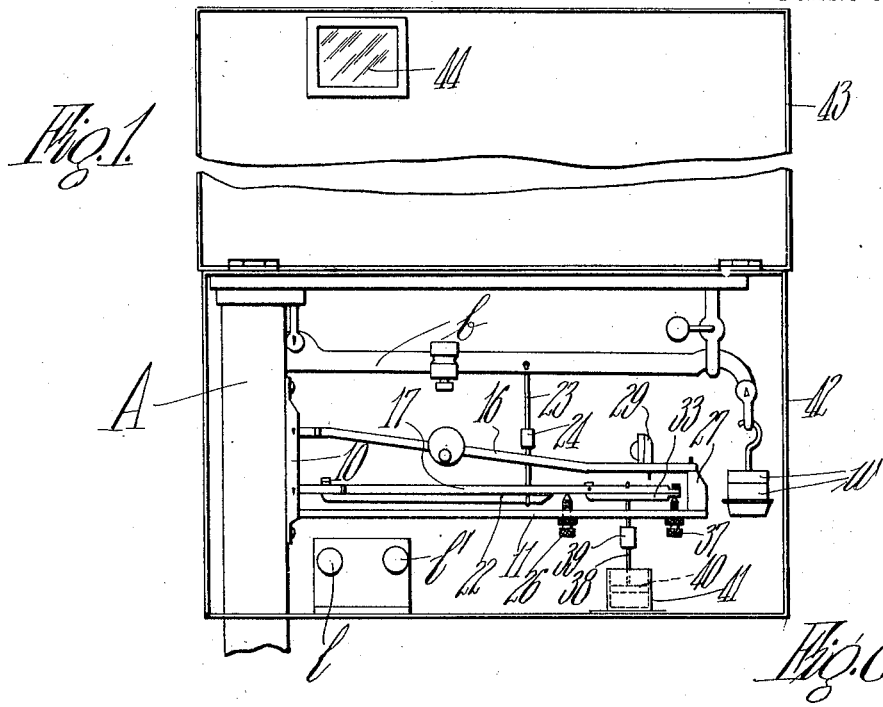
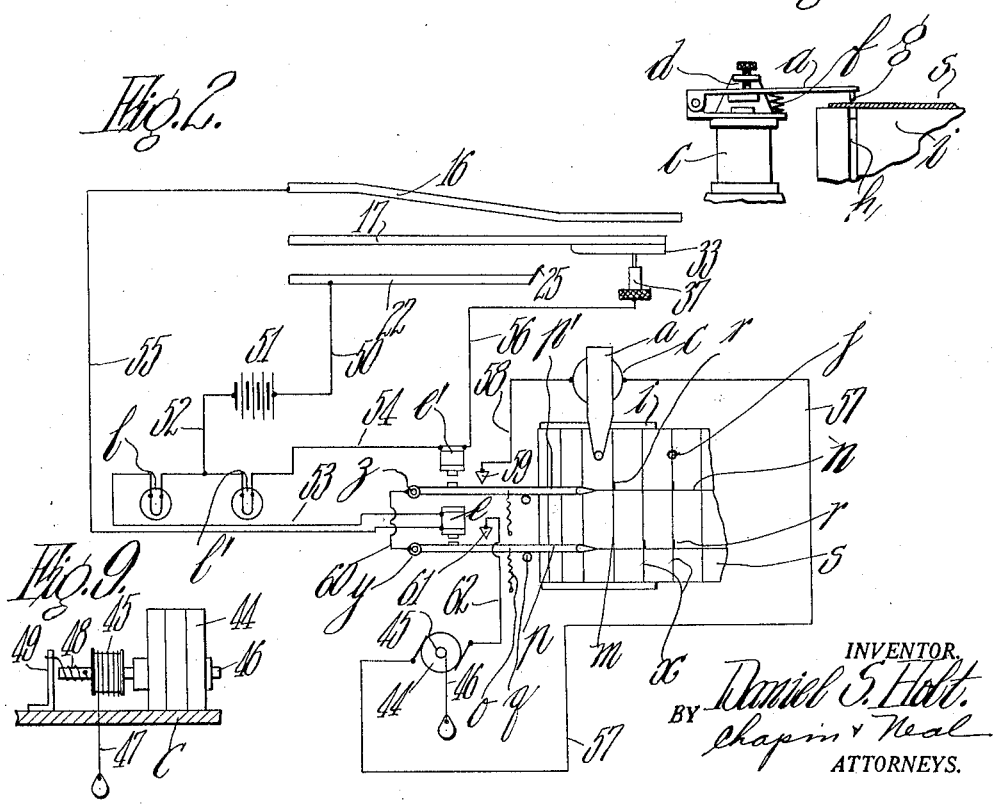
INVENTOR
Daniel S. Holt.
BY Chapin & Neal
ATTORNEYS.

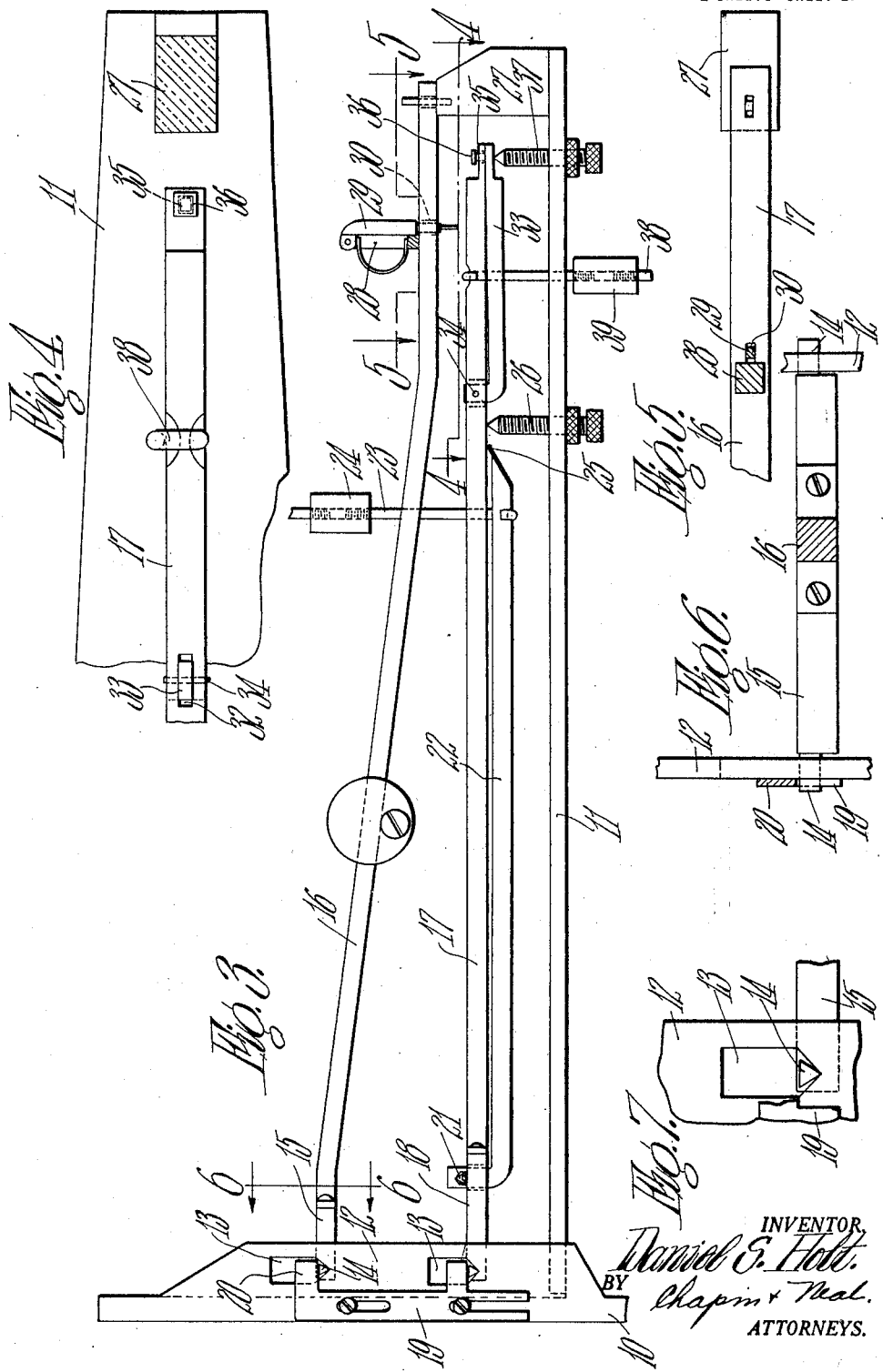

UNITED STATES PATENT OFFICE.

DANIEL S. HOLT, OF MITTINEAGUE, MASSACHUSETTS, ASSIGNOR TO STRATHMORE PAPER COMPANY, OF MITTINEAGUE, MASSACHUSETTS, A CORPORATION OF MASSACHUSETTS.

WEIGHING APPARATUS.

1,317,135.  Specification of Letters Patent.  Patented Sept. 23, 1919.

Application filed February 5, 1919. Serial No. 275,212.

*To all whom it may concern:*

Be it known that I, DANIEL S. HOLT, a citizen of the United States of America, residing at Mittineague, in the county of Hampden and State of Massachusetts, have invented certain new and useful Improvements in Weighing Apparatus, of which the following is a specification.

This invention relates to weighing apparatus and more particularly to a combination with such apparatus of signaling devices, designed to automatically indicate when the weighing element is in balance and to aid the operator by appropriate signals to obtain the desired balance.

An object of the invention is to provide a semi-automatic apparatus of the general type disclosed, which, as distinguished from the wholly automatic and necessarily costly apparatus, sometimes used, may be provided at low cost to serve the field between a wholly automatic and an entirely non-automatic apparatus.

Another object of the invention is to provide in combination with a weighing device, recording apparatus operable from the scale beam to register by appropriate means whether the load weighed was above, below or substantially of a desired predetermined weight.

Another object of the invention is to provide in combination with a weighing device, signaling means operated by the movement of the scale beam to aid the operator in quickly obtaining the desired balance.

A further object of the invention is to provide a generally improved switching device, operable from the weighing apparatus and designed to control electrical circuits, such as the signaling means or the recording apparatus, or the like.

Other objects and advantages will appear in the following description and in the illustrative embodiment of the invention, in the accompanying drawing, in which:

Figure 1 is an elevational view showing the invention as applied to a weighing device, such as a platform scales;

Fig. 2 is a diagrammatical view showing the electrical connections of the apparatus;

Fig. 3 is an enlarged elevational view of the switching device, shown as apart from the weighing device;

Figs. 4 and 5 are enlarged sectional plan views, taken on the lines 4—4 and 5—5 respectively of Fig. 3;

Fig. 6 is a fragmentary cross sectional view taken on the line 6—6 or Fig. 3;

Fig. 7 is a fragmentary elevation view of Fig. 6.

Figs. 8 and 9 are conventional views of certain parts of the apparatus to be later described.

The apparatus, in general, comprises a suitable weighing device; signaling means to indicate when the weighing device is in balance or when such device is slightly out of balance, by showing whether the load on the device is over or under weight; suitable apparatus to record the number of loads weighed by the device and show whether the loads were of correct or over or under the desired weight; and a switching device operated by the weighing device and arranged to control electrical circuits in which the signaling means and recording apparatus are included.

The weighing device may be of any suitable type and, as illustrated, takes the form of a platform scales, represented conventionally by A in Fig. 1. Weights $w$ are placed upon the scale beam $b$ so that the latter will balance when a load of predetermined weight has been placed upon the platform (not shown) of the scales.

The signaling means, as illustrated, consists of two electric lamps $l$ and $l'$ which are arranged to operate in the following manner. If the load on the scales is less than the predetermined weight, the lamp $l'$ only will be illuminated. If on the other hand the load on the scales is greater than the desired weight, the lamp $l$ only will be illuminated. If, however, the load on the scales is substantially of the desired weight, both lamps $l$ and $l'$ will be illuminated.

The recording apparatus includes a record sheet $s$ (Fig. 2), which is driven uniformly by suitable mechanism (not shown) and graduated by a series of transverse lines $x$. The driving mechanism is arranged, in the usual manner, to move the record sheet $s$ a distance, equal to that obtaining between successive lines $x$, in a predetermined time interval. All the described structure of the recording apparatus is of the known type and being well understood in the art, will require no further description here. The recording apparatus, also includes two pens $p$ and $p'$, which are pivoted at $y$ and $z$, respectively, and ride upon the record sheet $s$ to draw the lines $m$ and $n$ respectively thereon. Each pen is normally held in the illustrated position by a spring $o$, which tends to hold the pen against a stop $q$. Electromagnets $e$ and $e'$ are arranged adjacent pens $p$ and $p'$ respectively and, when energized, are capable of moving the pens against the tension of springs $o$, whereby jogs or offset portions $r$ may be made in the lines $m$ and $n$.

The recording apparatus furthermore includes a punching device, which is shown diagrammatically in Fig. 8. This device, consists of an electromagnet $c$, and a pivoted arm $a$, which is normally held against a stop $d$ by a spring $f$ but is movable away from the stop, when the magnet $c$ is energized. The arm $a$ carries a punch $g$, which overlies the record sheet $s$ and a circumferential groove $h$ in the drum $i$, over which the record sheet travels. Thus, on energization of magnet $c$, the punch $g$ will be depressed to perforate the record sheet $s$, making a small hole, such as is indicated at $j$ in Fig. 2.

The switching device is best shown in Fig. 3 and will now be described. As shown, the switching device includes an upright member 10 which is adapted to be secured to the upright post of the platform scales A (Fig. 1). Fixed to the member 10 is an outwardly and horizontally extending arm 11, which is composed of insulating material. The upright 10 has spaced flanges 12 (Fig. 6) in which are alined recesses 13, the lower parts of which are V-shaped (Fig. 7) to receive knife edges 14. The two knife edges are connected by a bar 15 of insulating material and secured to the latter is a metallic arm 16. Thus, the arm 17 is pivoted at one end to and insulated from the upright 10. Below the arm 16 and similarly pivoted at one end to and between the flanges 12 is a second arm 17, which is insulated from the flanges by a block 18 of insulating material. A bar 19 is adjustably secured to each flange 12 and has projections, as 20, to overlie the knife edges and prevent them from being jarred out of position in their V-shaped recesses. Pivoted to the arm 17, by means of a knife edge support 21 secured to the block 18 of insulating material, is a third arm 22, which is arranged below the arm 17.

The free end of arm 22 is suspended by a link 23 from the scale beam $b$ (Fig. 1) and such link includes a block 24 of insulating material to insulate the arm from the scale beam. The arm 17 is, thus, adapted to be lifted by the scale beam $b$ and to engage and lift the arm 22 which in turn is arranged to lift the arm 16. On the free end of arm 22 is a spring finger 25, which is adapted to engage with the under side of arm 17 and complete an electrical circuit, as will appear. The free end of arm 17 is supported from an adjustable abutment, in the shape of a screw 26, threaded into and extending upwardly from member 11. The free end of arm 16 also normally rests upon an abutment, as 27, which is secured to and projects upwardly from member 11. Near the free end of arm 16 is fixed an upstanding post 28, which is slotted, as indicated in Fig. 3, to receive an arm 29. The latter is pivoted at its upper end to post 29 and depends loosely through a hole 30 in arm 16 and has its lower end disposed in the path of arm 17. The engagement of arm 17 and arm 29 is arranged to complete a second electrical circuit, as will appear. A bow spring 31 is disposed in the slot of post 28 and tends to prevent lost motion or play in the pivoted connection of arm 29 with the post.

Near the free end of arm 17 there is a slot 32 (Fig. 4) to receive one end of an arm 33, which is pivotally connected to the arm by a pin 34. On the other end of arm 33 is fixed an upstanding pin 35 which passes upwardly and loosely through the arm 17. Pin 35 has a flanged head 36, which, when the parts occupy the relative positions shown, is slightly spaced from arm 17 but which is adapted to engage the latter and limit the swinging movement of arm 33 on its pivot 34. A screw 37, threaded into and upstanding from member 11, normally holds arm 33 in the illustrated position. Arm 17, is connected by a link 38 and insulating joint 39 to the plunger 40 of a dash pot 41 (Fig. 1). The dash pot functions to retard the upward movement of the parts and prevent flickering of the lamps $l$ and $l'$.

As shown in Fig. 1, the signals $l$ and $l'$, and the switching device are arranged adjacent the scale beam $b$ and, together with the latter, are housed with a suitable casing 42. The latter is provided with a cover 43 (shown in open position) and in the cover 43 is a window 44 through which the signals $l$ and $l'$ are visible when the cover is closed.

The apparatus also includes a manually operable device to energize the magnet $c$, which operates the punch $g$ of the recording apparatus. This device may be of any suitable type but, as shown, takes the form of a magneto 44, shown conventionally in Fig. 9. The magneto 44 is provided with a drum 45 on its armature shaft 46 and upon the drum is wound a cord 47. A torsion spring 48, one end of which is fixed to shaft 46 and the other to a suitable stationary support as 49, serves to return the armature of the magneto after it has been revolved by a downward pull on cord 47. The magneto is usually mounted above the ceiling as C, in a position adjacent scales A and with the cord 47 depending through the ceiling so that the operator can readily pull the cord and operate the magneto 44.

The electrical connections of the apparatus will now be described with reference to Fig. 2. The lower arm 22 is connected by a wire 50 to one terminal of a battery 51 and the other terminal of the latter is connected by a wire 52 to one terminal of each of the lamps $l$ and $l'$. The lamps $l$ and $l'$ are connected by wires 53 and 54 to one terminal of the magnets $e$ and $e'$ respectively. The other terminal of magnet $e$ is connected by a wire 55 to the metallic arm 16 and, the other terminal of the magnet $e'$ is connected by a wire 56 to the screw 37. The magneto 44 has one terminal connected by a wire 57 to the terminal of the punching magnet $c$ and the other terminal of the latter is connected by a wire 58 to a contact 59 arranged in the path of pen $p'$, so as to be engaged by the latter when the magnet $e'$ is energized. The pens $p$ and $p'$ are metallic and are connected together by a wire 60. A second contact 61 is arranged in the path of pen $p$, so as to be engaged by the latter when the magnet $e$ is energized, and contact 61 is electrically connected by a wire 62 to the other terminal of the magneto 44.

The operation of the apparatus will next be described. Normally, with no load on the scales A, the spring end 25 of the lower arm 22 does not engage the arm 17 and the finger 29 on the upper arm 16 does not engage the arm 17. Consequently, no circuit from battery 51 will be established through either signal $l$ or $l'$ or the magnets $e$ or $e'$, which are connected in series therewith. The pens $p$ and $p'$, then, remain in their illustrated position and draw the lines $m$ and $n$. The operator then places a load on scales A. For example, the operator may run a wheelbarrow onto the platform of scales A and then fill the barrow with coal. As the load on the scales approaches the predetermined weight, the scale beam $b$ commences to rise and, in rising, first lifts the lower arm 22 until its spring end 25 engages arm 17. With such engagement, an electrical circuit is completed through the battery 51 to the lamp $l'$ and magnet $e'$, which circuit may be traced as follows: from the battery 51 by wire 50 to arm 22 and member 25, thence along arm 17 and the arm 33 (metallically connected therewith) to the screw 37, and then by wire 56 to magnet $e'$, thence by wire 54 to lamp $l'$, returning by wire 52 to battery 51. Thus lamp $l'$ will be illuminated, as the scale beam approaches its position of balance, to indicate that the load is nearly but not quite of the predetermined weight. Simultaneously, pen $p'$ is attracted by magnet $e'$ to make a jog, such as $r$ in the line $n$.

The operator, having obtained the signal from lamp $l'$, will place more load on the scales A. Possibly, the load on the latter may then exceed the predetermined weight. If such is the case, the arm 22 will lift arm 17, and as the latter rises, arms 33 will drop away from it to the extent permitted by head 36 of pin 35. The arm 17 will, however, be lifted sufficiently to completely draw arm 33 out of engagement with screw 37, whereby the circuit just described is broken and lamp $l'$ is extinguished and pen $p'$ brought back to the normal position illustrated. The lifting of bar 17, in case of an overload on scales A, is sufficient, not only to draw arm 33 out of engagement with screw 37, but to also cause it (the arm 17) to engage the finger 29 and slightly lift the arm 16. The engagement of finger 29 and arm 17 establishes a second electrical circuit through battery 51, which circuit may be traced as follows: from battery 51 by wire 50 to arm 22, thence by spring 25 to arm 17, then by finger 29 to arm 16, from the latter by wire 55 to magnet $e$, from the latter by wire 53 to lamp $l$, and thence by wire 52 to the other terminal of the battery. Thus, lamp $l$ will be illuminated to indicate to the operator the fact of overweight on the scales and pen $p$ will be attracted by magnet $e$ to make a jog, such as $r$, in line $m$.

Now, if the scale beam is in balance, or substantially so (within the limits of the apparatus, say five or six pounds), the arm 17 will be so positioned that it engages finger 29 and so that arm 33 will also engage screw 37. The extent of swinging movement of arm 33 relatively to arm 17 is made just sufficient for this purpose. With the condition described both the circuits, above described, will be established and both lamps $l$ and $l'$ will be illuminated to indicate the fact of balance. Simultaneously both pens $p$ and $p'$ will be attracted by their magnets $e$ and $e'$ and held against the contacts 59 and 61 respectively. Then the circuit from the magneto 44 to magnet $c$ is completed and whenever cord 47 is pulled, to rotate the magneto armature, the magnet $c$ will be energized and the punch $g$ depressed to make the perforation $j$. It will be apparent that the punch $g$ cannot be actuated unless both magnets $e$ and $e'$ are energized, and thus, unless the scale beam $b$ is in balance, or substantially so.

The described apparatus may be advantageously used as an efficiency measure, to make the operators use care in weighing. For example, in connection with power plants, it is desirable to keep accurate records of daily coal consumption. It has been found that with nothing more than a tally sheet, on which the operator sets down the weight of each load carried to the boiler room, that the loads are not weighed carefully and consequently the record of coal consumption is far from accurate. With the present system, a bonus may be paid to the operator for every perfectly weighed load, as an incentive for him to use care. This bonus would be determined by the number of punch marks *j* in the record sheet. The incentive for care being present, the apparatus described makes the work as easy as possible for the operator. He has no weights to adjust and no tally sheet to attend to but merely loads his barrow until both lamps are illuminated. He then pulls the cord 47 and a permanent record of the load is made.

The invention has been disclosed herein in one form for illustrative purposes but it is recognized that various modifications may be made, having for their object the use of the invention in a form differing from the particular one disclosed. It is therefore desired to have the scope of the invention defined by the appended claims interpreted by the spirit of the present disclosure rather than by the letter of the exact form disclosed.

What I claim is:

1. The combination with the scale beam of a weighing device, of two indicating devices, means operable by movement of the scale beam to actuate one of said devices when the scale beam lies on one side of its balanced position, a second means operable by movement of the scale beam to actuate the other of said devices when the scale beam lies on the other side of its balanced position, both of said devices arranged to be actuated by their respective means when the scale beam is substantially in balanced position.

2. The combination with the scale beam of a weighing device, of a recording device, means operable by movement of the scale beam to actuate said device when the scale beam lies on one side of its balanced position, a second recording device, means operable by movement of the scale beam to actuate the latter when the scale beam lies on the other side of its balanced position, both of the recording devices arranged to be actuated by their respective means when the scale beam lies substantially in its balanced position, a third recording device, and controlling means to render the last-named recording device inoperative except when both the other recording devices are actuated.

3. In apparatus of the class described, a movable switching element, spaced members in the path of said element and disposed one on each side thereof, a part connected to said element for restricted relative movement and adapted to engage one of said members while the element itself engages the other member, an electric circuit including said element and one of said members, and a second electric circuit including said element and the other of said members, all constructed and arranged so that said element may be moved to one position to effect the closing of one circuit and to a second position to effect the closing of both circuits.

4. A switching device, comprising, an element adapted to be lifted by the lifting of the scale beam of a weighing device, a part connected to said element for restricted relative movement so that it is not lifted immediately on the lifting of the element, a contact member with which said part normally engages, a contact member above the element with which it may engage, all constructed and arranged so that the element may be lifted to engage the second contact member while said part remains in engagement with the first contact member, and means permitting the second contact member to be moved by said element on further movement thereof so that said part may be moved away from the first contact member while the element remains engaged with the second contact member.

5. A switching device, comprising, a movable member adapted for connection to the scale beam of a weighing device for movement thereby, a movable element normally held out of engagement with said member but movable by the latter on its lifting movement, a part connected to said element for restricted relative movement so that it is not lifted immediately on the lifting of the element, a contact member with which said part normally engages, a contact member above the element with which it may engage, all constructed and arranged so that the element may be lifted to engage the second contact member while said part still remains in engagement with the first contact member, and means permitting the second contact member to be moved by said element on further movement thereon so that said part may be moved away from the first contact member while the element remains engaged with the first contact member.

6. A switching device, including three normally separated elements movable in a common plane, means adapted to connect one of said elements to a movable part of a weighing device for moving such element, the latter arranged to engage and move the intermediate element and the intermediate element to engage and move the other element, a part on the third named element for engagement with the second element to control one electrical circuit, a fixed contact normally engaged with the second element, and a part on the first element to engage the second element and control a second electrical circuit, when the second element engages said fixed contact, said last named part arranged for limited movement relatively to the second member so that it may engage the fixed contact while the second element engages the part on the third element.

7. A switching device, comprising, three movable arms arranged one above another in a common plane and pivoted on different centers, means normally supporting each arm so that the arms are maintained in separated relation, means to connect the lower arm to the scale beam of a weighing device so that the arm may be lifted by the latter and so that the other arms may be successively engaged and lifted on continued movement of the first arm, a member pivoted to the second arm near its free end, and normally resting on said supporting means, means connecting the free end of said member to the second arm for limited movement so that the second arm may move into engagement with the upper arm while said member remains engaged with said supporting means.

8. The combination with the scale beam of a weighing apparatus, of a recording apparatus including a movable record sheet and two marking devices resting upon the sheet, magnets arranged when energized to deflect the pens out of their normal path, means controlled by the movement of said beam to energize one magnet when the scale beam is above and to energize the other magnet when the scale beam is below its position of balance and to energize both when in the latter position, an electromagnetic device to also operate on the record sheet, an electric circuit including said last named device, and the switches in said circuit electrically connected in series so that both must be closed before the last named device can be energized, said switches arranged for actuation one by each pen and being movable to closed position on the attraction of the pens by said magnets.

DANIEL S. HOLT.

Copies of this patent may be obtained for five cents each, by addressing the "Commissioner of Patents, Washington, D. C."